United States Patent
Wang et al.

(10) Patent No.: US 11,740,508 B2
(45) Date of Patent: Aug. 29, 2023

(54) BACKLIGHT MODULE AND DISPLAY DEVICE

(71) Applicants: K-Tronics (Suzhou) Technology Co., Ltd., Jiangsu (CN); BOE Technology Group Co., Ltd., Beijing (CN)

(72) Inventors: Weifeng Wang, Beijing (CN); Shengchang Shen, Beijing (CN); Zijian Guo, Beijing (CN); Yuanhang Huang, Beijing (CN)

(73) Assignees: K-Tronics (Suzhou) Technology Co., Ltd., Jiangsu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/789,714

(22) PCT Filed: Aug. 4, 2021

(86) PCT No.: PCT/CN2021/110679
§ 371 (c)(1),
(2) Date: Jun. 28, 2022

(87) PCT Pub. No.: WO2022/062703
PCT Pub. Date: Mar. 31, 2022

(65) Prior Publication Data
US 2023/0032572 A1    Feb. 2, 2023

(30) Foreign Application Priority Data

Sep. 28, 2020    (CN) .......................... 202022174751.9

(51) Int. Cl.
*G02F 1/13357* (2006.01)

(52) U.S. Cl.
CPC .. *G02F 1/133608* (2013.01); *G02F 1/133605* (2013.01); *G02F 1/133606* (2013.01)

(58) Field of Classification Search
CPC ......... G02F 1/133314; G02F 1/133606; G02F 1/133605; G02F 1/333608
See application file for complete search history.

(56) References Cited

U.S. PATENT DOCUMENTS

| | | | |
|---|---|---|---|
| 9,395,477 | B2 | 7/2016 | Im et al. |
| 10,216,021 | B2 | 2/2019 | Awazu et al. |
| 10,330,976 | B2 | 6/2019 | Ogura et al. |
| 2006/0152471 | A1 | 7/2006 | Sugawara |
| 2009/0256796 | A1 | 10/2009 | Jang et al. |
| 2012/0162569 | A1 | 6/2012 | Sekiguchi et al. |
| 2014/0184927 | A1* | 7/2014 | Shimomichi ..... G02F 1/133308 348/794 |
| 2014/0362301 | A1 | 12/2014 | Masuda et al. |

(Continued)

FOREIGN PATENT DOCUMENTS

| | | |
|---|---|---|
| CN | 1804693 A | 7/2006 |
| CN | 103988120 A | 8/2014 |

(Continued)

*Primary Examiner* — Karabi Guharay
(74) *Attorney, Agent, or Firm* — IPRO, PLLC

(57) ABSTRACT

A backlight module includes a front frame (1), a screen (3), and a flexible buffer layer (2) located between the front frame (1) and the screen (3). In a direction from the front frame (1) to the screen (3), a gap between the front frame (1) and the screen (3) is filled with the flexible buffer layer (2); and the flexible buffer layer (2) is in an elastic compression state.

20 Claims, 1 Drawing Sheet

(56) References Cited

U.S. PATENT DOCUMENTS

| | | | |
|---|---|---|---|
| 2015/0234116 A1* | 8/2015 | Azuma | G02F 1/133608 |
| | | | 362/97.1 |
| 2016/0170258 A1 | 6/2016 | Maruno | |
| 2016/0291243 A1 | 10/2016 | Okitsu et al. | |
| 2022/0026626 A1* | 1/2022 | Wang | G02B 6/0088 |
| 2022/0066256 A1* | 3/2022 | Baek | G02F 1/133317 |
| 2022/0137461 A1* | 5/2022 | Wang | G02F 1/133605 |
| | | | 362/97.1 |
| 2022/0163838 A1* | 5/2022 | Lin | G02F 1/1347 |
| 2023/0032572 A1* | 2/2023 | Wang | G02F 1/133608 |

FOREIGN PATENT DOCUMENTS

| | | |
|---|---|---|
| CN | 105765293 A | 7/2016 |
| CN | 206147212 U | 5/2017 |
| CN | 212723610 U | 3/2021 |
| KR | 20080049217 A | 6/2008 |
| WO | 2015145557 A1 | 10/2015 |

* cited by examiner

BACKLIGHT MODULE AND DISPLAY DEVICE

CROSS REFERENCE TO RELATED APPLICATIONS

The present disclosure is a national phase entry under 35 U.S.C. § 371 of International Application No. PCT/CN2021/110679, filed on Aug. 4, 2021, which claims the priority of Chinese Patent Application No. 202022174751.9, filed with the China National Intellectual Property Administration on Sep. 28, 2020 and entitled "BACKLIGHT MODULE AND DISPLAY DEVICE", the entire contents of which are incorporated herein by reference.

FIELD

The present application relates to the technical field of display, in particular to a backlight module and a display device.

BACKGROUND

With the continuous development of science and technology, many electronic products on the market have adopted LCD screens, but the shortcomings of the LCD screens are also very prominent. In the assembly process of some LCD screens, there will be different degrees of point-like or surface-like whitening at the contact part of the screens and front frames, which is generally called light leakage. In addition, if gaps between the front frames and the screens are too large, light will leak through the gaps, which is generally called a light transmission phenomenon. This is mainly because during the processing of the front frames, the straightness cannot be guaranteed to be 100% consistent, the contact between the screens and the front frames is uneven, and the force is uneven.

At present, in order to solve this problem in the industry, a conventional conductive foam is usually added to the inner side of the front frame. However, the conventional conductive foam has a performance of a certain hardness and poor compressibility. In the process of mass production, there is a certain deformation of the conventional conductive foam, thus the gap between the front frame and the screen is uneven, which causes the screen to be stressed, resulting in the phenomena of light transmission and light leakage. Therefore, how to solve the phenomena of light transmission and light leakage between the front frame and the screen is an urgent problem to be solved in the industry.

SUMMARY

The present application provides a backlight module. The backlight module includes a front frame, a screen, and a flexible buffer layer located between the front frame and the screen. In a direction from the front frame and the screen, a gap between the front frame and the screen is filled with the flexible buffer layer, and the flexible buffer layer is in an elastic compression state.

In the backlight module provided by the present application, the flexible buffer layer is disposed between the front frame and the screen, and the flexible buffer layer is in the elastic compression state while filling the gap between the front frame and the screen, that is, the flexible buffer layer is in interference-fit with the front frame and the screen. On the one hand, the gap between the front frame and the screen is filled with the flexible buffer layer, which can solve the problem of light transmission. On the other hand, due to a good buffer performance of the flexible buffer layer, the flexible buffer layer is in the elastic compression state between the front frame and the screen, and will not compress the screen, thereby avoiding the possibility of light leakage.

Therefore, according to the backlight module provided by the present application, the flexible buffer layer which has a good buffering effect and is in interference-fit with the front frame and the screen is disposed between the front frame and the screen, so as to achieve the effect of preventing both light leakage under compression and light transmission.

Preferably, a material of the flexible buffer layer is a flexible buffer material with a compressive strength being less than or equal to 5 KPa.

Preferably, a compression set ratio of the flexible buffer layer is less than or equal to 30%.

Preferably, the material of the flexible buffer layer is an NBR/PVC open-cell rubber-plastic extrusion foaming material.

Preferably, the material of the flexible buffer layer is JK-1105.

Preferably, a gap value between the front frame and the screen is 0.6-2.4 mm.

Preferably, a thickness of the flexible buffer layer in a natural state is 120%-170% of the gap value.

Preferably, the backlight module further includes an adhesive strip, an adhesive frame, a light source diffusing plate, reflective paper and a back plate which are located on a side of the screen facing away from the flexible buffer layer and sequentially disposed in a direction from the flexible buffer layer to the screen.

Preferably, the present application further provides a display device, including the backlight module described according to any one of the above.

In the accompanying drawings:
1—Front frame; 2—Flexible buffer layer; 3—Screen; 4—Adhesive strip; 5—Adhesive frame; 6—Light source diffusing plate; 7—Reflective paper; and 8—Back plate.

DETAILED DESCRIPTION OF THE EMBODIMENTS

The technical solutions of embodiments of the present application will be described clearly and completely in combination with the accompanying drawings of the embodiments of the present application. Apparently, the described embodiments are some, but not all, embodiments of the present application. Based on the embodiments in the present application, all other embodiments obtained by those ordinarily skilled in the art without making creative work belong to the protection scope of the present application.

An existing liquid crystal display device usually adopts a direct type backlight module structure. The structure is composed of reflective paper and a diffusing plate, and a screen being fixed on a back plate through a front frame. A light source inside the module emits light, and the screen transmits a picture. For the liquid crystal display device, light leakage and light transmission are problems that must be solved in the industry. The conventional solution is: in order to prevent the screen from being pressed and causing light leakage, a certain gap should be left between the screen and the front frame. The larger the gap, the more effective the improvement of the light leakage. But the gap is larger, there will be a phenomenon that the light source is emitted from the gap, that is, the result of light transmission is caused. In terms of structure theory, the smaller the gap between the screen and the front frame, the smaller the risk of light transmission, but the greater the risk of light leakage caused by the compression of the screen; and the larger the gap, the smaller the risk of light leakage, but the greater the risk of light transmission.

Generally, a conventional auxiliary material is disposed between the screen and the front frame, and a thickness of the conventional auxiliary material is smaller than the gap between the screen and the front frame, but this structure will lead to loss of partial light transmission.

Figure 1:
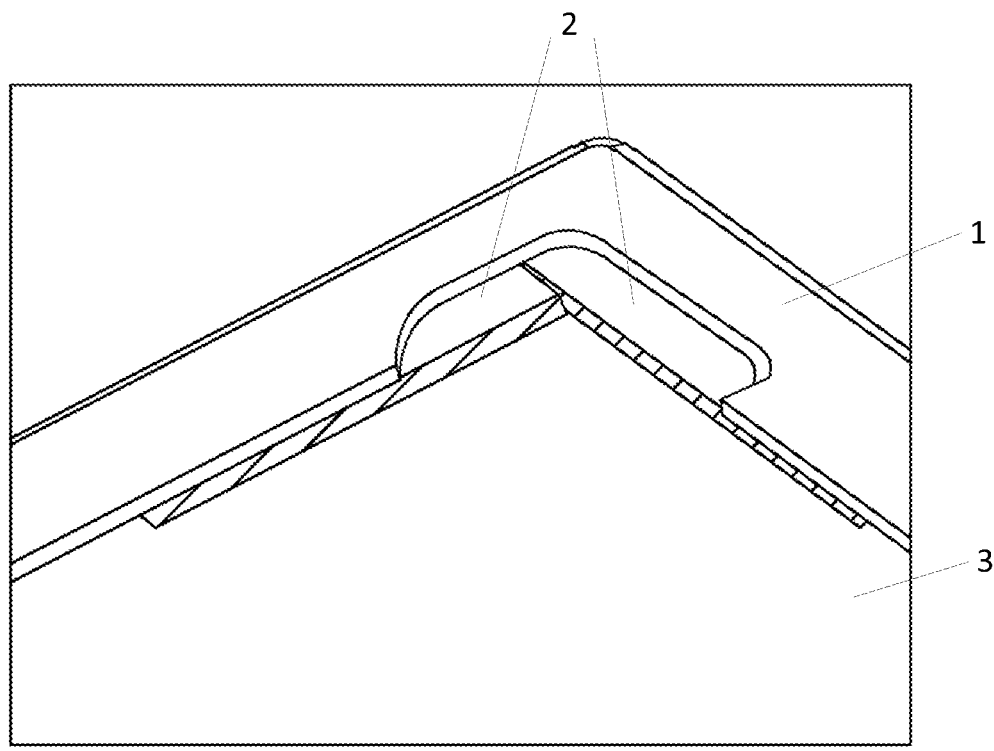
FIG. 1 is an enlarged schematic diagram of an assembly structure of a front frame, a flexible buffer layer and a screen in the present application.
Figure 2:
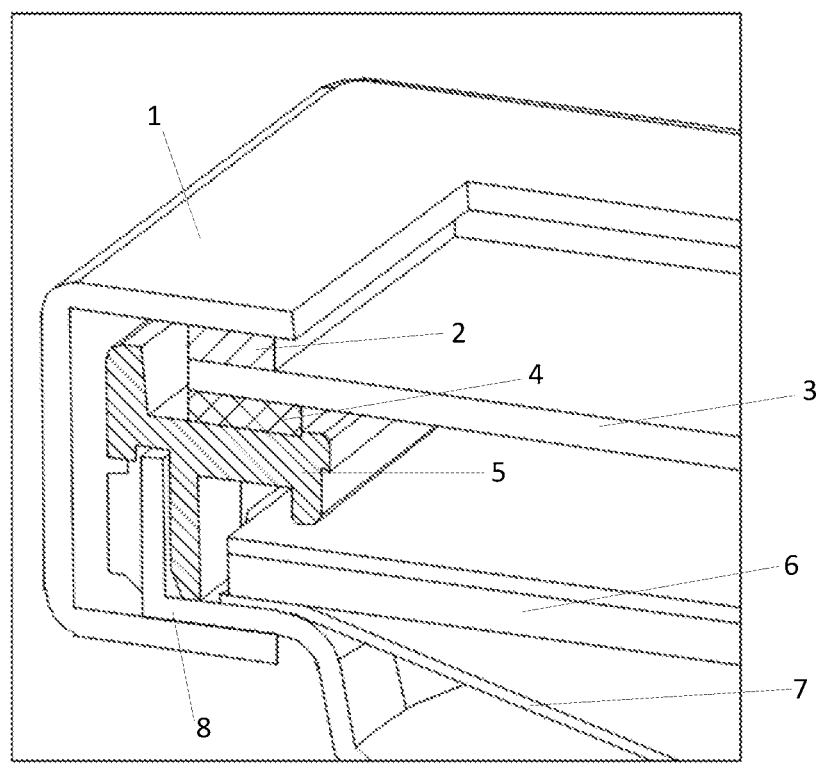
FIG. 2 is a schematic structural diagram of a backlight module in the present application.

In view of this, refer to FIG. 1 and FIG. 2, the present application provides a backlight module, including a front frame 1, a screen 3, and a flexible buffer layer 2 located between the front frame 1 and the screen 3. In a direction from the front frame 1 to the screen 3, a gap between the front frame 1 and the screen 3 is filled with the flexible buffer layer 2, and the flexible buffer layer 2 is in an elastic compression state.

According to the backlight module provided by the present application, the flexible buffer layer 2 is disposed between the front frame 1 and the screen 3, the gap between the screen 3 and the front frame 1 is filled with the flexible buffer layer 2, and the flexible buffer layer 2 is in the elastic compression state. That is, the flexible buffer layer 2 in interference-fit with the front frame 1 and the screen 3 is adopted. On the one hand, the gap between the front frame 1 and the screen 3 is filled with the flexible buffer layer 2, which can solve the problem of light transmission. On the other hand, due to the good buffer performance of the flexible buffer layer 2, the flexible buffer layer 2 is in the elastic compression state between the front frame 1 and the screen 3, and will not compress the screen 3, thereby avoiding the possibility of light leakage.

Therefore, according to the backlight module provided by the present application, the flexible buffer layer 2 which has a good buffering effect and is in interference-fit with the front frame 1 and the screen 3 is disposed between the front frame 1 and the screen 3, so as to achieve the effect of preventing both light leakage under compression and light transmission.

A material of the above-mentioned flexible buffer layer 2 may be a flexible buffer material with a small compressive strength. To a certain extent, when the compressive strength of the flexible buffer material is smaller, an elastic deformation amount of the flexible buffer material is larger, while interference fit between the flexible buffer layer 2 and the front frame 1 as well as between the flexible buffer layer 2 the screen 3 is ensured, the flexible buffer layer 2 may also better withstand the elastic deformation caused by the force between the screen 3 and the front frame 1, without compressing the screen 3 to cause light leakage. In some embodiments, the compressive strength of the flexible buffer material is less than or equal to 5 KPa.

The above-mentioned flexible buffer layer 2 may also have the characteristic of a small compression set rate. To a certain extent, the smaller the compression set rate of the material of the flexible buffer layer 2, the better the elasticity of the material, while interference fit between the flexible buffer layer 2 and the front frame 1 as well as between the flexible buffer layer 2 the screen 3 is better ensured, the flexible buffer layer 2 may also better withstand the elastic deformation caused by the force between the screen 3 and the front frame 1, without compressing the screen 3 to cause light leakage. In some embodiments, the compression set ratio of the above-mentioned flexible buffer layer 2 is less than or equal to 30%.

In an optional embodiment, the material of the flexible buffer layer 2 in the present application is NBR/PVC open-cell rubber-plastic extrusion foaming material, which has excellent elasticity, the material is assembled between the front frame 1 and the screen 3, firstly, it is ensured that the gap between the front frame 1 and the screen 3 is filled to avoid the occurrence of light transmission, and secondly, due to the small compressive strength, a large elastic deformation will occur, and the screen 3 will not be compressed so as to avoid the occurrence of light leakage.

In an optional embodiment, the material of the flexible buffer layer 2 in the present application is JK-1105, which has excellent elasticity, its compressive strength may reach 3.1 Kpa, and its compressive set rate may reach 5.4%, and according to an assembly test between the material and the front frame 1 as well as between the material and the screen 3, the material may be compressed by 85%-90% of its own thickness. The above material is assembled between the front frame 1 and the screen 3, firstly, it is ensured that the gap between the front frame 1 and the screen 3 is filled to avoid the occurrence of light transmission, and secondly, due to the small compressive strength, a large elastic deformation will occur, and the screen 3 will not be compressed so as to avoid the occurrence of light leakage.

Generally, a gap value between the front frame 1 and the screen 3 is 0.6-2.4 mm. When the above-mentioned JK-1105 is used as the material of the flexible buffer layer 2, a value range of a thickness of the flexible buffer layer 2 in a natural state may be 120%-170% of the gap value between the front frame 1 and the screen 3. Exemplarily, when a diagonal length of a display region of a liquid crystal display is 24-55 inches, and the gap value between the screen 3 and the front frame 1 is 0.8-1 mm, then the thickness of the flexible buffer layer 2 in the natural state may be set at 1-1.4 mm. When the diagonal length of the display region of the liquid crystal display is 65-75 inches, and the gap value between the screen 3 and the front frame 1 is 1-1.4 mm, then the thickness of the flexible buffer layer 2 in the natural state may be set at 1.2-1.6 mm. When the diagonal length of the display region of the liquid crystal display is 85-98 inches, and the gap value between the screen 3 and the front frame 1 is 1.8-2.4 mm, then the thickness of the flexible buffer layer 2 in the natural state may be set at 2-2.6 mm.

It should be noted that the selection of the above numerical values is only for illustration, and in actual production and use, different numerical values may also be selected according to requirements, which are not limited here.

Further, the backlight module provided by the present application further includes an adhesive strip 4, an adhesive frame 5, a light source diffusing plate 6, reflective paper 7 and a back plate 8 which are located on a side of the screen 3 facing away from flexible buffer layer 2 and sequentially disposed in a direction from the flexible buffer layer 2 to the screen 3. The above-mentioned backlight module is a direct type backlight module. A light source inside the module emits light and transmits a picture through the screen 3. When the flexible buffer layer 2 is disposed between the front frame 1 and the screen 3, the effects of preventing light leakage and light transmission are achieved at the same time, and the quality of the picture is ensured.

Based on the same inventive idea, the present application may also provide a display device, including the above-mentioned backlight module. Since the above-mentioned backlight module well achieves the effect of ensuring buffering without the light leakage under compression and the light transmission at the same time, the display effect of the display device is guaranteed, and the quality of the product and the user experience are improved.

Apparently, those skilled in the art can make various modifications and variations to the embodiments of the present application without departing from the spirit and scope of the present application. In this way, under the condition that these modifications and variations of the present application fall within the scope of the claims of the present application and their equivalent technologies, the present application is also intended to include these modifications and variations.

What is claimed is:

1. A backlight module, comprising:
   a front frame,
   a screen, and
   a flexible buffer layer between the front frame and the screen,
   wherein in a direction from the front frame and the screen, a gap between the front frame and the screen is filled with the flexible buffer layer, and the flexible buffer layer is in an elastic compression state;
   wherein a material of the flexible buffer layer is a flexible buffer material with a compressive strength being less than or equal to 5 KPa.

2. The backlight module according to claim 1, wherein a compression set ratio of the flexible buffer layer is less than or equal to 30%.

3. The backlight module according to claim 1, wherein a material of the flexible buffer layer is an NBR/PVC open-cell rubber-plastic extrusion foaming material.

4. The backlight module according to claim 1, wherein a material of the flexible buffer layer is JK-1105.

5. The backlight module according to claim 1, wherein a value of the gap between the front frame and the screen is 0.6-2.4 mm.

6. The backlight module according to of claim 5, wherein a thickness of the flexible buffer layer in a natural state is 120%-170% of the value of the gap.

7. The backlight module according to claim 1, further comprising:
   an adhesive strip, an adhesive frame, a light source diffusing plate, reflective paper and a back plate which are located on a side of the screen facing away from the flexible buffer layer and sequentially disposed in a direction from the flexible buffer layer to the screen.

8. A display device, comprising a backlight module, wherein the backlight module comprises:
   a front frame,
   a screen, and
   a flexible buffer layer between the front frame and the screen,
   wherein in a direction from the front frame and the screen, a gap between the front frame and the screen is filled with the flexible buffer layer, and the flexible buffer layer is in an elastic compression state;
   wherein a material of the flexible buffer layer is a flexible buffer material with a compressive strength being less than or equal to 5 KPa.

9. The display device according to claim 8, wherein a compression set ratio of the flexible buffer layer is less than or equal to 30%.

10. The display device according to claim 8, wherein a material of the flexible buffer layer is an NBR/PVC open-cell rubber-plastic extrusion foaming material.

11. The display device according to claim 8, wherein a material of the flexible buffer layer is JK-1105.

12. The display device according to claim 8, wherein a value of the gap between the front frame and the screen is 0.6-2.4 mm.

13. The display device according to claim 12, wherein a thickness of the flexible buffer layer in a natural state is 120%-170% of the value of the gap.

14. The display device according to claim 8, further comprising:
   an adhesive strip, an adhesive frame, a light source diffusing plate, reflective paper and a back plate which are located on a side of the screen facing away from the flexible buffer layer and sequentially disposed in a direction from the flexible buffer layer to the screen.

15. A backlight module, comprising:
   a front frame,
   a screen, and
   a flexible buffer layer between the front frame and the screen,
   wherein in a direction from the front frame and the screen, a gap between the front frame and the screen is filled with the flexible buffer layer, and the flexible buffer layer is in an elastic compression state;
   wherein a material of the flexible buffer layer is an NBR/PVC open-cell rubber-plastic extrusion foaming material.

16. The backlight module according to claim 15, wherein a material of the flexible buffer layer is a flexible buffer material with a compressive strength being less than or equal to 5 KPa; and a compression set ratio of the flexible buffer layer is less than or equal to 30%.

17. The backlight module according to claim 15, wherein a material of the flexible buffer layer is JK-1105.

18. The backlight module according to claim 15, wherein a value of the gap between the front frame and the screen is 0.6-2.4 mm.

19. The backlight module according to claim 18, wherein a thickness of the flexible buffer layer in a natural state is 120%-170% of the value of the gap.

20. The backlight module according to claim 15, further comprising:
   an adhesive strip, an adhesive frame, a light source diffusing plate, reflective paper and a back plate which are located on a side of the screen facing away from the flexible buffer layer and sequentially disposed in a direction from the flexible buffer layer to the screen.

* * * * *